United States Patent
Bose et al.

(10) Patent No.: US 11,202,974 B2
(45) Date of Patent: Dec. 21, 2021

(54) MINERAL RECOVERY CONTROL

(71) Applicant: INTELLISENSE.IO LTD, Cambridge (GB)

(72) Inventors: Sam Bose, Cambridge (GB); Denis Rubtsov, Cambridge (GB); Hugh McNamara, Cambridge (GB); Boris Wolter, Cambridge (GB); Mark de Geus, London (GB)

(73) Assignee: INTELLISENSE.IO LTD, Cambridge (GB)

( * ) Notice: Subject to any disclaimer, the term of this patent is extended or adjusted under 35 U.S.C. 154(b) by 0 days.

(21) Appl. No.: 16/481,910

(22) PCT Filed: Jan. 30, 2018

(86) PCT No.: PCT/EP2018/025023
§ 371 (c)(1),
(2) Date: Jul. 30, 2019

(87) PCT Pub. No.: WO2018/137893
PCT Pub. Date: Aug. 2, 2018

(65) Prior Publication Data
US 2020/0038782 A1    Feb. 6, 2020

(30) Foreign Application Priority Data
Jan. 30, 2017 (GB) .................................... 1701489

(51) Int. Cl.
*B01D 21/01* (2006.01)
*B01D 21/34* (2006.01)
*B01F 15/00* (2006.01)
*B03B 13/00* (2006.01)
*B03B 5/60* (2006.01)

(52) U.S. Cl.
CPC ............. *B01D 21/01* (2013.01); *B01D 21/34* (2013.01); *B01D 2311/04* (2013.01);
(Continued)

(58) Field of Classification Search
CPC .... B01D 21/30; B01D 21/34; B01D 2311/04; B03B 13/00; B01F 15/00123; C02F 1/5209
See application file for complete search history.

(56) References Cited

U.S. PATENT DOCUMENTS

| 4,226,714 A | 10/1980 | Furness et al. |
| 2005/0109702 A1* | 5/2005 | Dwyer ...................... C02F 1/56 210/723 |

(Continued)

FOREIGN PATENT DOCUMENTS

| DE | 19617528 A1 | 11/1997 |
| EP | 0677315 A2 | 10/1995 |

(Continued)

OTHER PUBLICATIONS

Unesi, Majid et al—"Modeling the effects of ore properties on water recovery in the thickening process"—International Journal of Minerals, Metallury and Materials—2014 (Year: 2014).*

(Continued)

*Primary Examiner* — Bradley R Spies
(74) *Attorney, Agent, or Firm* — Ziegler IP Law Group, LLC

(57) ABSTRACT

A mineral recovery system for use in a mining operation is described. The mineral recovery system includes a mining operations model generated based on inputs of sensed conditions, wherein the mining operations model incorporates a thickener sub-model and a material sub-model. The mineral recovery system includes a thickener controller to issue commands based on the mining operations model. The mineral recovery system includes a thickener having a process water. The thickener also includes an underflow output provided with an underflow controller to adjust outflow of thickened slurry from the thickener based on (Continued)

issued commands. The thickener further includes an overflow output to dispense clarified water from the thickener.

20 Claims, 3 Drawing Sheets

(52) U.S. Cl.
CPC ........... *B01F 15/00123* (2013.01); *B03B 5/60* (2013.01); *B03B 13/00* (2013.01)

(56) References Cited

U.S. PATENT DOCUMENTS

| | | | | |
|---|---|---|---|---|
| 2009/0277840 A1* | 11/2009 | Guertin | ..................... | C02F 9/00 210/665 |
| 2011/0272346 A1 | 11/2011 | Descamps et al. | | |
| 2015/0176893 A1* | 6/2015 | Revington | ................ | F26B 1/00 34/381 |
| 2016/0059152 A1* | 3/2016 | Bakeev | .................. | B01D 21/01 241/22 |

FOREIGN PATENT DOCUMENTS

| | | |
|---|---|---|
| WO | 9721988 A2 | 6/1997 |
| WO | 9743027 A1 | 11/1997 |
| WO | 0119489 A1 | 3/2001 |

OTHER PUBLICATIONS

Day, Ayon—Machine Learning Algorithms: A Review—International Journal of Computer Science and Information Technologies, vol. 7 (3), 2016, 1174-1179 (Year: 2016).*

International Search Report, Application No. PCT/EP2018/025023, dated Apr. 24, 2018, 2 pages.

Combined Search and Examination Report under sections 17 and 18(3) issued in GB Application No. GB1701489.5 dated May 31, 2017, 9 pages.

International Preliminary Report on Patentability issued in International Patent Application No. PCT/EP2018/025023 dated Jul. 30, 2019, 7 pages.

\* cited by examiner

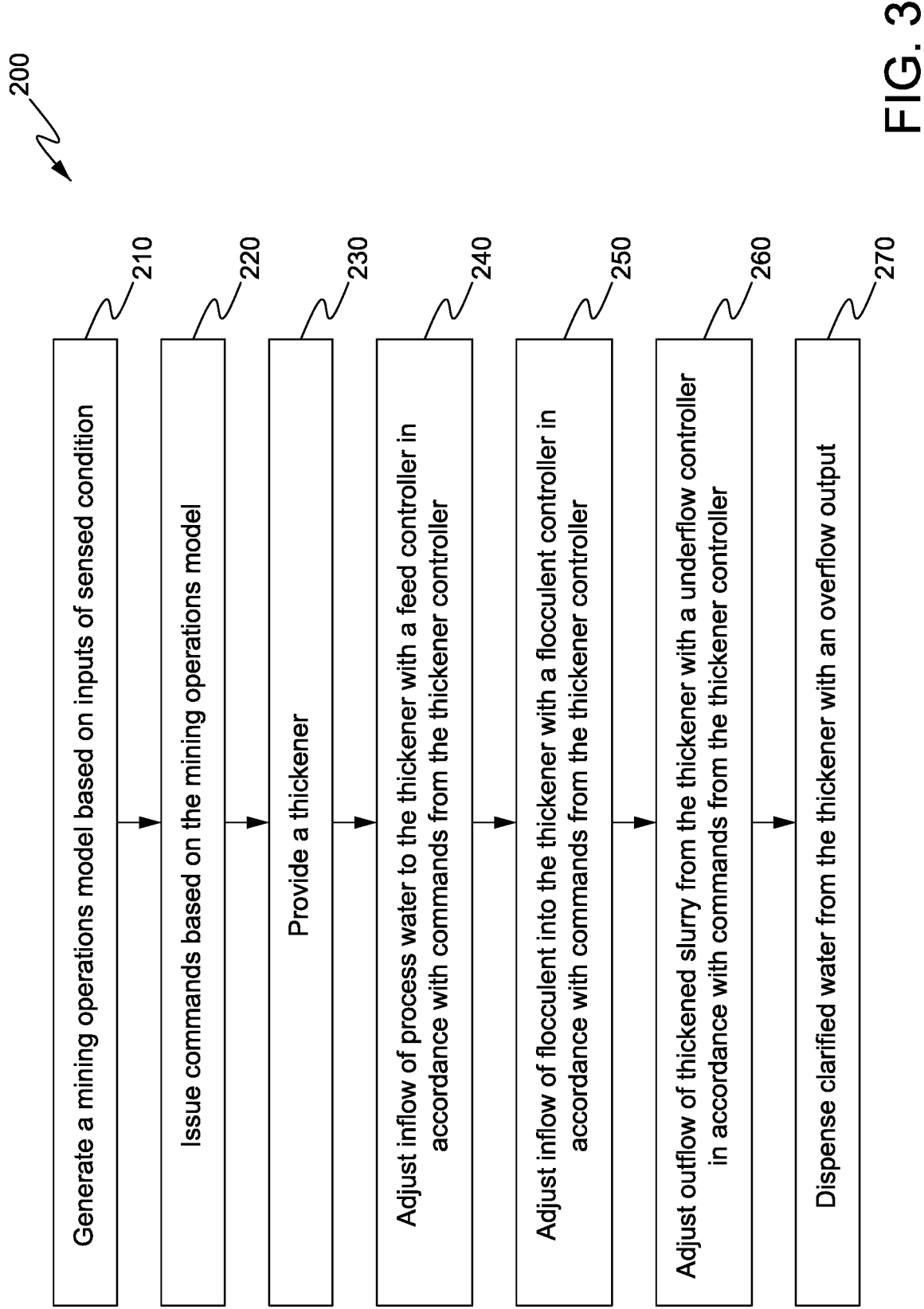

MINERAL RECOVERY CONTROL

TECHNICAL FIELD

The present disclosure relates to mineral recovery control and to thickener control schema for optimizing the mining operation.

BACKGROUND

The supply of water is a basic requirement for most mineral processing operations. Since mines are often located in areas with limited water supply, water recovery is very important for sustainable operation and for reducing the costs of mining. Water recovery often requires dewatering tailings by using one or more thickeners. When applied in tailings dewatering and liquid ore concentrate extraction thickeners separate solid and liquid fractions. Solid particles settle to the bottom of the thickener and are removed as underflow, while liquid overflows from the top of the thickener. This occurs in a way such that underflow from the bottom has a high solid content while overflow is clear, with minimal mineral content. Maximising solid concentration of underflow is furthermore important for structural stability of tailing dams.

However, in practice, most feeds settle very slowly, overflow clarity is poor and thickener throughput to achieve a given underflow solids concentration is low. In particular, water recovery (or an equivalent metric such as the underflow solids concentration) can fall below design values as settling processes in the thickener are affected by the lithological composition of the slurry, poor control decisions about flocculant dosage and underflow rates. Therefore, most feeds settle slowly because thickener optimization is impeded by constantly changing conditions of upstream processes such as milling, grinding and separation. In this regard, it is worth it to mention that a flocculant is added to the thickener feed which joins solid particles together and increases the rate of settling.

Some techniques have been developed to model thickeners for predicting and improving thickener operation. However, an accurate prediction of thickener throughput is difficult to model because of the number of factors involved. Previous approaches include "Expert Systems", layered atop stabilization controllers for the individual components (for example pumps). Generally speaking, existing methods utilize rules to choose set-points for controllable components and do not attempt to predict the behaviour of the thickener.

Therefore, there is a need for more accurate models for thickener operation. Furthermore, applied system and methods may utilize such models to issue control commands to the thickener for optimizing the mining operation.

SUMMARY

The present disclosure seeks to provide a mineral recovery system for use in a mining operation.

The present disclosure also seeks to provide a method for mineral recovery in a mining operation.

In one aspect, the present disclosure provides a mineral recovery system for use in a mining operation. The mineral recovery system includes a mining operations model generated based on inputs of sensed conditions, wherein the mining operations model incorporates a thickener sub-model and a material sub-model. The mineral recovery system includes a thickener controller configured to issue commands based on the mining operations model. The mineral recovery system includes a thickener. The thickener includes a process water input. The thickener also includes an underflow output provided with an underflow controller configured to adjust outflow of thickened slurry from the thickener in accordance with commands from the thickener controller. The thickener further includes an overflow output configured to dispense clarified water from the thickener.

Optionally, the process water input is provided with a feed controller configured to adjust inflow of process water to the thickener in accordance with commands from the thickener controller.

Optionally, the thickener also includes a flocculant input.

Optionally, the thickener also includes a flocculant dilution input.

More optionally, the flocculant input is provided with a flocculant controller configured to adjust inflow of flocculant into the thickener in accordance with commands from the thickener controller.

More optionally, the flocculant dilution input is provided with a flocculant dilution controller configured to adjust inflow of dilution water into the thickener in accordance with commands from the thickener controller.

Optionally, the sensed conditions include conditions sensed at the thickener.

Optionally, the sensed conditions include conditions at one or more upstream systems of the mining operation.

Optionally, the sensed conditions include derived conditions that are calculated from any number of the other sensed conditions.

Optionally the outputs of the thickener sub-model are quantitative predictions of the key performance variables. Optionally, the thickener sub-model is comprised of combinations or hybrids of physical, statistical, and/or machine learning models. Optionally, the predictions are conditioned on future control settings.

Optionally, the material sub-model incorporates a material transport sub-model model.

More optionally, the material transport sub-model predicts geological composition of material flows through upstream systems which may include primary crusher feed, overland conveyor feed, SAG mill feed, pebble crusher feed, stockpile to ball mills feed, ball mill feed, hydrocyclone feed flow rate, hydrocyclone feed density, secondary hydrocyclone feed flow rate and secondary hydrocyclone feed density.

Optionally, the material sub-model incorporates a material influence sub-model.

More optionally, the material influence sub-model relates particle size, lithology and chemical alteration to the settling properties of the material.

In another aspect, the present disclosure provides a method for mineral recovery in the mining operation. The method includes providing a thickener and a thickener controller. The method further includes generating a mining operations model based on inputs of sensed conditions, wherein the mining operations model incorporates a thickener sub-model and a material sub-model. The method further includes, using the thickener controller, issuing commands based on the mining operations model. The method further includes using a process water input of the thickener. The method may further include, using the process water input of the thickener, adjusting inflow of process water to the thickener with the feed controller in accordance with commands from the thickener controller. The method may further include adjusting the inflow of flocculant into the thickener and/or the flocculant dilution in accordance with commands from the thickener controller. The method further includes, using an underflow output of the thickener, adjusting outflow of thickened slurry from the thickener with the underflow controller in accordance with commands from the thickener controller. The method further includes, dispensing clarified water from the thickener with the overflow output.

Optionally, the method comprises providing the process water input with a feed controller, wherein the feed controller is configured to adjust inflow of process water to the thickener in accordance with commands from the thickener controller.

Optionally, the thickener also includes a flocculant input.

Optionally, the thickener also includes a flocculant dilution input.

More optionally, the method comprises providing the flocculant input with a flocculant controller, wherein the flocculant controller is configured to adjust inflow of flocculant into the thickener in accordance with commands from the thickener controller.

More optionally, the flocculant dilution input is provided with a flocculant dilution controller configured to adjust inflow of dilution water into the thickener in accordance with commands from the thickener controller.

Optionally, inputting sensed conditions to the mining operations model includes inputting conditions sensed at the thickener.

Optionally, inputting sensed conditions to the mining operations model includes inputting conditions sensed at one or more upstream systems of the mining operation.

Optionally, inputting sensed conditions to the mining operations includes inputting sensed conditions to a thickener sub-model.

Optionally the outputs of the thickener sub-model are quantitative predictions of the key performance variables.

Optionally, the thickener sub-model is comprised of combinations or hybrids of physical, statistical, and/or machine learning models.

Optionally, the predictions are conditioned on future control settings.

Optionally, inputting sensed conditions to the mining operations model includes inputting sensed conditions to a material sub-model.

More optionally, inputting sensed conditions to the material sub-model includes inputting sensed conditions to a material transport sub-model.

More optionally, the method includes, with the material transport sub-model, relating geological composition of a primary crusher feed, overland feed, SAG mill feed, pebble crusher feed stockpile to ball mills feed, ball mill feed, hydrocyclone feed flow rate, hydrocyclone feed density, secondary hydrocyclone feed flow rate and secondary hydrocyclone feed density.

More optionally, inputting sensed conditions to the material sub-model further comprises inputting sensed conditions to a material influence sub-model.

More optionally, the method includes, with the material influence sub-model, relating particle size, lithology and alteration.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale.

Wherever possible, like elements have been indicated by identical numbers.

Figure 1:
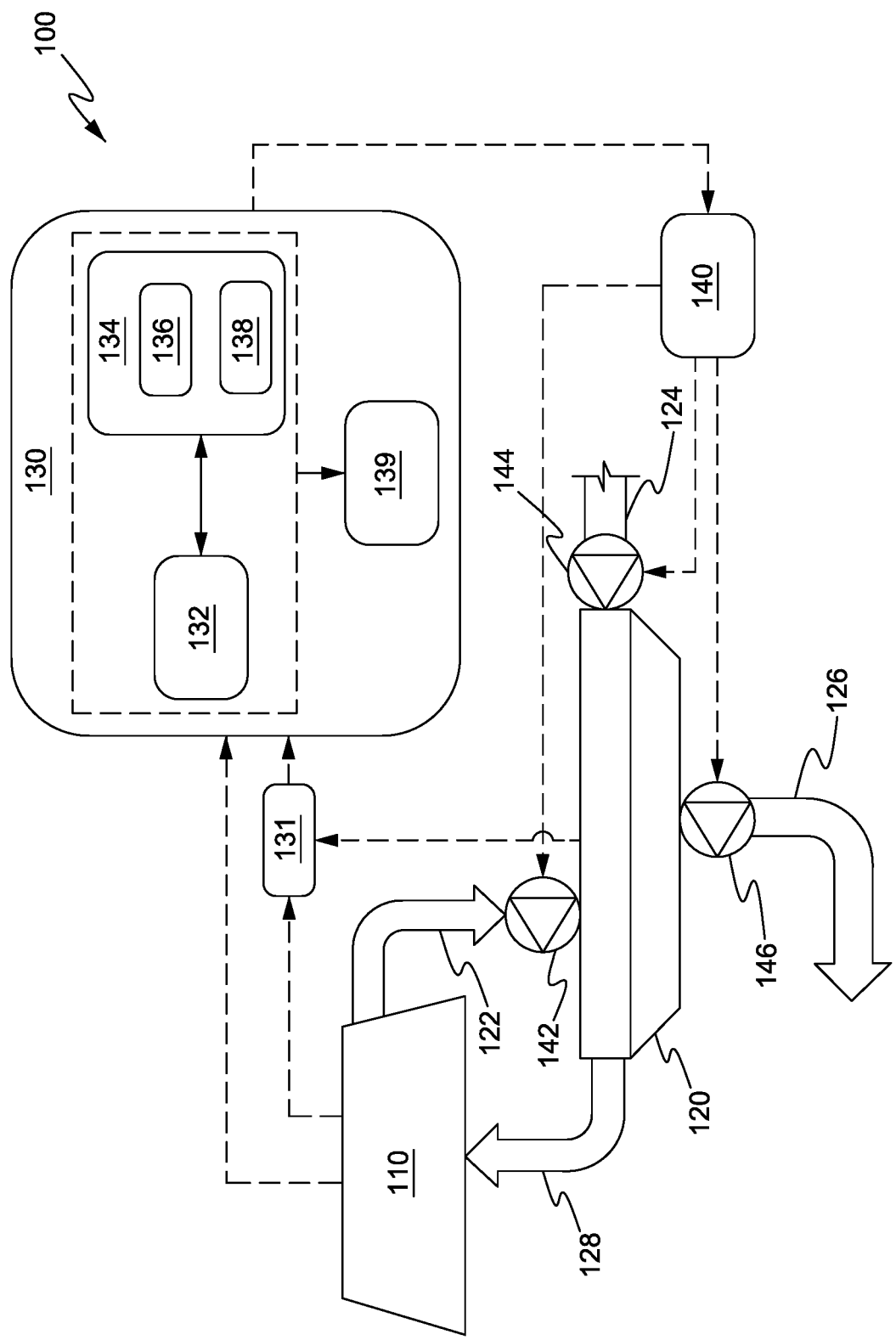
Figure 2:
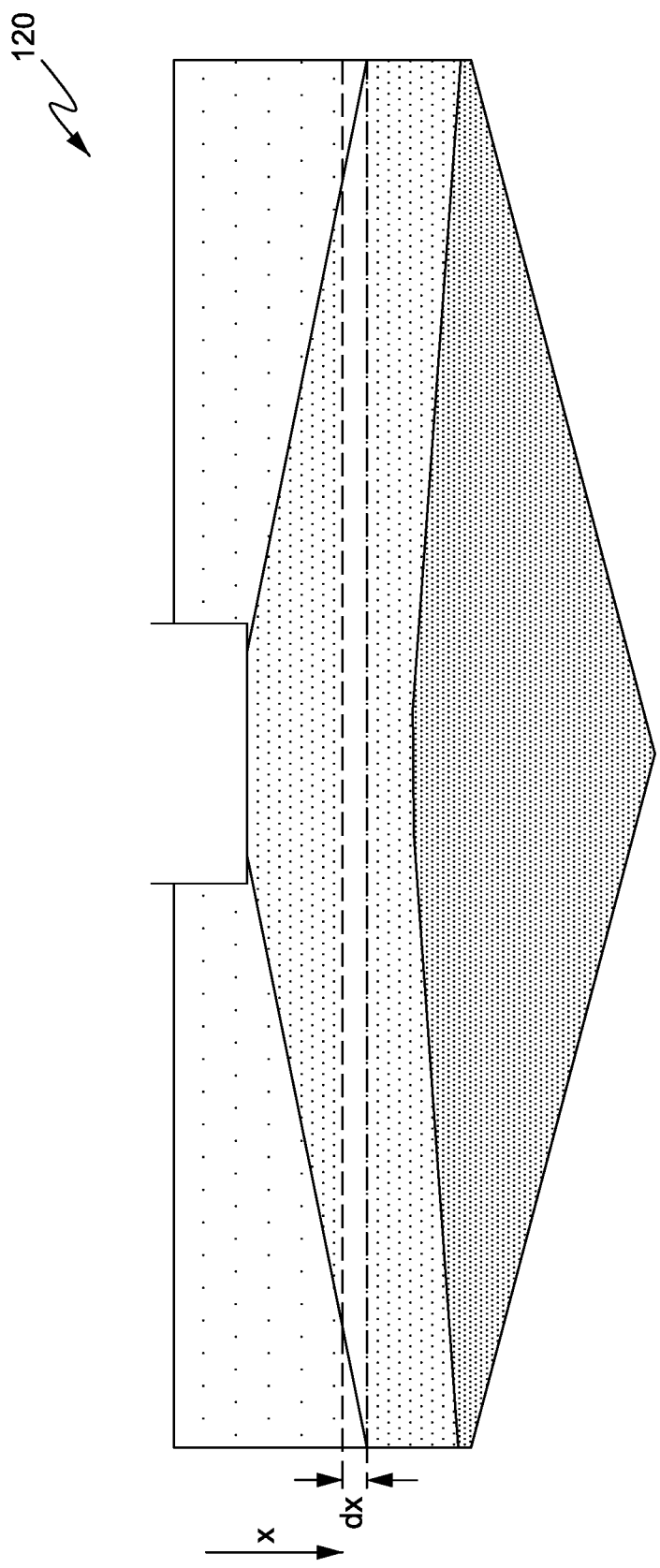

Embodiments of the present disclosure will now be described, by way of example only, with reference to the following diagrams wherein:

FIG. 1 is a schematic illustration of a mineral recovery system, in accordance with an embodiment of the present disclosure;

FIG. 2 is a schematic illustration of a thickener, in accordance with an embodiment of the present disclosure; and FIG. 3 is a flow chart depicting the steps involved in a method for mineral recovery, in accordance with an embodiment of the present disclosure.

DETAILED DESCRIPTION

The following detailed description illustrates embodiments of the present disclosure and manners by which they can be implemented. Although the best mode of carrying out the present disclosure has been disclosed, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the present disclosure provide a mineral recovery system for use in a mining operation. The mineral recovery system includes a mining operations model generated based on inputs of sensed conditions, wherein the mining operations model incorporates a thickener sub-model and a material sub-model. The mineral recovery system also includes a thickener controller configured to issue commands based on the mining operations model. The mineral recovery system includes a thickener. The thickener includes a process water input for receiving process water from one or more upstream systems of the mining operation. The thickener also includes an underflow output for removing thickened slurry from the thickener. The underflow output is provided with an underflow controller configured to adjust outflow of thickened slurry from the thickener in accordance with commands from the thickener controller. The thickener further includes an overflow output configured to dispense clarified water from the thickener.

Optionally, the process water input is provided with a feed controller configured to adjust inflow of process water to the thickener in accordance with commands from the thickener controller Optionally, the thickener also includes a flocculant input for introducing flocculant into the thickener.

Optionally, the flocculant input is provided with a flocculant controller configured to adjust inflow of flocculant into the thickener in accordance with commands from the thickener controller Optionally the thickener also includes a flocculant dilution input for introducing flocculant dilution into the thickener.

Optionally, the flocculant dilution input is provided with a flocculant dilution controller configured to adjust inflow of flocculant dilution into the thickener in accordance with commands from the thickener controller.

Optionally, the sensed conditions include conditions sensed at the thickener.

Optionally, the sensed conditions include conditions at one or more upstream systems of the mining operation.

Optionally, the sensed conditions include derived conditions that are calculated from any number of the other sensed conditions.

Optionally, the mining operations model incorporates a thickener sub-model.

The outputs of the thickener sub-model are quantitative predictions of the key performance variables. Optionally, the thickener sub-model is comprised of combinations or hybrids of physical, statistical, and/or machine learning models. Optionally, the predictions are conditioned on future control settings.

Optionally, the mining operations model incorporates a material sub-model. More optionally, the material sub-model incorporates a material transport sub-model model. More optionally, the material transport sub-model predicts geological composition of material flows through upstream systems which may include primary crusher feed, overland conveyor feed, SAG mill feed, pebble crusher feed, stockpile to ball mills feed, ball mill feed, hydrocyclone feed flow rate, hydrocyclone feed density, secondary hydrocyclone feed flow rate and secondary hydrocyclone feed density.

Further embodiments of the present disclosure provide a method for mineral recovery in the mining operation. The method includes generating a mining operations model based on inputs of sensed conditions wherein the mining operations model incorporates a thickener sub-model and a material sub-model. The method further includes issuing commands from a thickener controller based on the mining operations model. The method may further include providing a thickener. The method may further include, at the process water input provided in the thickener and configured to receive process water from one or more upstream systems of the mining operation, adjusting inflow of process water to the thickener with the feed controller in accordance with commands from the thickener controller. The method may further include, adjusting inflow of flocculant into the thickener with the flocculant controller in accordance with commands from the thickener controller. The method may further include, at a flocculant dilution input provided in the thickener and configured to introduce flocculant dilution into the thickener, adjusting inflow of flocculant dilution into the thickener with the flocculant dilution controller in accordance with commands from the thickener controller. The method further includes, at the underflow output provided in the thickener and configured to remove thickened slurry from the thickener, adjusting outflow of thickened slurry from the thickener with the underflow controller in accordance with commands from the thickener controller. The method further includes, dispensing clarified water from the thickener with the overflow output.

Referring to FIG. 1, a high-level schematic of a mineral recovery system 100 is illustrated in accordance with an embodiment of the present disclosure. The mineral recovery system 100 is utilized for extracting a metal from a mineral ore including a refractory ore contained in a gangue. The mineral recovery system 100 includes a concentrator plant 110 of any known conventional design, and having components for milling, grinding and separation. The concentrator plant 110 is used for crushing, including grinding, the mineral ore to liberate the refractory ore from the gangue. The concentrator plant 110 further processes the crushed mineral ore to produce a concentrate in which a concentration of the refractory ore is larger than a concentration of the refractory ore in the mineral ore. In some examples, the concentrator plant 110 also introduces a mixture of water and reacting agents in order to produce slurry of concentrate ore. In some examples, the concentrator plant 110 may further be configured to perform additional steps for preparing concentrate to be fed to a thickener (discussed below). Such concentrator plant 110 is widely known in the art, and thus has not been described in detail herein for the brevity of the disclosure. The mineral recovery system 100 may further include numerous systems and units which work in conjunction with the concentrator plant 110 to form the concentrate slurry, also known as tailings.

As illustrated in FIG. 1, the mineral recovery system 100 also includes a thickener 120. In one example, the thickener 120 is located downstream of the concentrator plant 110 in order to receive the tailings. For this purpose, the mineral recovery system 100 may include one or more pumps (not shown), or the like, to transport the tailings from the concentrator plant 110 to the thickener 120. The thickener 120 is used to recover water from the concentrate slurry received therein. In simple terms, dewatering in a thickener 120 involves gravity acting on the density difference between the solid particles and the carrier liquid (usually water), enabling the solid particles to settle. As the solids concentration of the slurry increases, the settling rate progressively slows and above a critical solids concentration, the slurry exhibits a network structure and forms a bed at the base of the thickener 120. The output of the thickener 120 can accommodate a range of tailings disposal options from low yield stress, easily pumped suspensions for disposal in conventional 'wet' tailings dams to more concentrated slurries for delivery to 'dry disposal' and backfill applications. The shape of the thickener 120, as shown in FIG. 1, is for illustration purposes only without any limitations.

In one embodiment of the present disclosure, the thickener 120 includes a process water input 122 for receiving process water from one or more upstream systems of the mining operation. It may be understood that the process water includes the tailings, i.e., the concentrated slurry to be processed. In other words, the process water input 122 may receive the tailings from upstream of the thickener 120 or the concentrator plant 110, in the mineral recovery system 100. The process water input 122 may be in the form of a tube or inlet provided in the thickener 120, allowing for an inflow of process water into the thickener 120. The thickener 120 also includes a flocculant input 124 for introducing flocculant into the thickener 120. Further, the thickener 120 includes an underflow output 126 for removing thickened slurry from the thickener 120. The thickener 120 also includes an overflow output 128 configured to dispense clarified water from the thickener 120. For the purpose of simplification, the height between the underflow output 126 and the overflow output 128 in the thickener 120 is hereinafter referred to as thickener operation height 'H'.

In an embodiment of the present disclosure, the mineral recovery system 100 operates under the influence of a mining operation model 130, hereinafter sometimes simply referred to as "model". In an example, the model 130 may be generated by sensed conditions including conditions sensed at the thickener 120 as well as conditions sensed at one or more upstream systems of the mining operation, particularly the concentrator plant 110. The sensed conditions may include, but are not limited to, the current state of the thickener 120, such as the feed flow rate, feed density, underflow flow rate, underflow solids concentration, bed height, bed pressure, and rake torque, speed, and height. Further, the sensed conditions may include the geo-metallurgical and physical properties of material which will be fed into the thickener circuit over the following time period as well as other derived conditions. The mineral recovery system 100 may include one or more sensors 131 which may be in communication with the concentrator plant 110, the thickener 120 and other components, to receive the sensed conditions. The sensors 131 may be of any suitable type, such as, but not limited to, motion sensor, pressure sensor, flow sensor, etc. The model 130 further considers the relationships between several changing quantities in the thickener 120, such as the feed rate, flocculant consumption, bed pressure and percentage of solid in the tailings. The model 130 may apply any combination or hybrid of various techniques, for example partial differential equation (PDE) modelling or machine learning methods such as artificial neural networks and reinforcement learning, to simulate the control of this dynamic Multiple-Input/Multiple-Output system.

In an embodiment of the present disclosure, the mining operations model 130 incorporates a thickener sub-model 132. The thickener sub-model 132 is a prognostic model of the thickener 120 and defines the internal dynamics of the thickener 120 to predict future states from recent measurements, future control settings, and, optionally, predicted inputs from the material sub-model 134. The thickener sub-model 132 may exploit a machine learning model, a physical simulation of the thickener 120, e.g., using a Partial Differential Equation model, or both of these. It may be understood that more than one thickener sub-model 132 may be incorporated to improve the performance of the overall system.

In an embodiment of the present disclosure, the mining operations model 130 incorporates a material sub-model 134. The material sub-model 134 defines the upstream portion of the process and predicts characteristics of the material which will enter the thickener 120 in the future. That is, the material sub-model 134 collects data from the entire mineral recovery system 100, including the concentrator plant 110, and predicts the arrival time of material at the thickener 120 and the properties of the arrived material. It may be understood that the material sub-model 134 may require configuration for a particular mineral recovery system/plant. Further, in an embodiment, the material sub-model 134 incorporates a material transport sub-model 136 and a material influence sub-model 138. The material sub-model 134 is a dynamic computational model that accounts for both material transport through the plant, and influence of specific material on the thickener performance.

In one example, the material transport sub-model 136 considers flow of material and residence times through the concentrator plant 110. In order to track specific geological material through the plant and estimate the residence times associated with the various processing stages, the material transport sub-model 136 yields a digital representation of the circuit machinery and material streams, the design mass balance, and the measured process parameters such as flow rates, densities, and material composition. The material transport sub-model 136 may use a discrete time approach for updating the state of the processing circuit. The material transport sub-model 136 may also be used to account for accumulation or depletion of inventory of material inside the equipment and for deriving feed and outflow properties such as solid flux. The material transport sub-model 136 relates material properties of material being fed into the thickener 120 from the concentrator plant 110. These properties may include but are not limited to geological composition of a primary crusher feed, overland feed, SAG mill feed, pebble crusher feed, stockpile to ball mills feed, ball mill feed, hydrocyclone feed flow rate, hydrocyclone feed density, secondary hydrocyclone feed flow rate, and/or secondary hydrocyclone feed density.

The material influence sub-model 138 considers the influence of material type on the thickener performance. The material influence sub-model 138 may exploit machine learning models based on available data from field settling tests and historical records. The material influence sub-model 138 predicts key settling properties such as settling velocity and estimated percentage of underflow solids, from geological composition, chemical alterations, and information about particle size distribution of the feed material. Further, the material influence sub-model 138 relates particle size, lithology and alteration of material being fed into the thickener 120 from the concentrator plant 110.

By predicting the geo-metallurgical and physical properties of the material entering the thickener 120, as well as its expected settling properties, the material model 132 enables the thickener circuit operator to plan for changes in material composition, hence delivering proactive circuit management. The model 130 may further simulate the future performance of the one or more thickeners 120. The time range for the future simulation may vary between, but is not limited to, 30 minutes and 2 hours. The model 130 describes relationships between quantities and their future trajectories for each significant input, output, control, and internal system variable.

In an example, a PDE is used for model 130, describing the concentration of solids as a function of position and time in the thickener 120. This is quantified by the volume fraction occupied by solids, which will be described, for example, by an unknown function u. To simplify the calculation in the model, u is averaged over small horizontal slices as schematically shown in FIG. 2. Referring to FIG. 2, at one stage of the thickener 120, a large proportion of the sediments are settled below, unclear water with some sediment stands in the middle, and substantially clear water is at the top. However, it may be contemplated that the model 130 may quantify any stage of operation of the thickener 120 with this approach.

In one example, the model 130, used for the thickener 120, utilizes a quasi-linear first-order PDE of mixed type: hyperbolic and parabolic such that the equation may behave more like a transport/wave equation (hyperbolic) or more like a diffusion equation (parabolic), depending on where in the thickener is being considered. These two regions represent the zones in the thickener 120 where (a) hindered settling is taking place (or the water is "clear") and (b) where consolidation of solids has occurred and the solids are compressing.

It may be understood that inputs to the model 130 for simulation of the thickener 120 include but are not limited to recent sensed conditions of feed flow rate, feed density, feed solids concentration, underflow flow rate, flocculant dose, flocculant dilution flow rate, bed pressure, rake torque, and bed height, and underflow solids concentration, and estimated parameters. Further, the outputs of the material sub-model 134 including particle size distribution and settling parameters, such as settling velocity and final bed height may be used as inputs. It may be understood by a person skilled in the art that outputs of the model 130 may include but are not limited to potential future trajectories of percentage of solids in underflow, bed height, bed pressure, and rake torque.

The model 130, including the sub-models 132, 134, 136, 138, forms the lowest layer in a system of algorithms which assimilate measurements from the plant equipment, provide advance warning of unwanted situations, and make recommendations and changes to the controls of the thickener to improve and optimize its performance. In some examples, an ensemble, or swarm, of models may be used with a Bayesian system to assimilate new measurements, which may be used to account for the imperfect measurement of the apparatus and the environment. The ensemble also produces probabilistic predictions and provides estimates of the reliability of the system outputs. Such advanced techniques may be contemplated by a person skilled in the art, and thus have not been described in detail herein for the brevity of the present disclosure.

In some examples of the model 130, a configurable optimization engine 139 forms the higher layer in the system 100, providing new settings for the control variables in order to maintain a high-performance state. It may be understood that the model 130 may utilize data from throughout the plant to affect longer-term stabilization and optimization of operation of the thickener 120. The model 130 may be used to predict the various functions of the thickener 120; which in turn may be used to optimize the operation of the thickener 120 and improve the overall efficiency of the mineral recovery system 100. In particular, the model 130 calculates an ideal control configuration for the thickener 120 as a function of the geo-metallurgical and physical properties of the feed material and its predicted settling properties. Further, the model 130 may calculate an ideal control configuration for the thickener 120 as a function of any other properties (or conditions) sensed. Further, the model 130 attempts to predict and issue alerts when the future operation of the thickener 120 will deviate from defined optimal operating conditions.

For this purpose, the mineral recovery system 100 includes a thickener controller 140 configured to issue commands for controlling, or specifically optimizing, the operations of the thickener 120 based on the mining operations model 130. The thickener controller 140 may encompass any system which uses computing devices, including, but not limited to, mobile based system, PC based system with web applications, etc. In an example, the thickener controller 140 may include a memory configured to store one or more components of the model 130 or outputs thereof as computer readable instructions and a processor configured to execute the instructions to issue commands to the thickener 120. In particular, the thickener controller 140 may utilize the solutions of the equations of the models 130 for various configurations of the thickener 120 and find the best-known solutions for various controls of the thickener 120 for its optimized operation. In an example, the processor of thickener controller 140 processes computer readable instructions stored in the thickener controller memory in order to solve the equations.

In one embodiment, the thickener controller 140 may be in signal communication with a feed controller 142 associated with the process water input 122. The feed controller 142 is configured to adjust inflow of process water to the thickener 120 in accordance with commands from the thickener controller 140. The thickener controller 140 may also be in signal communication with a flocculant controller 144 associated with the flocculant input 124. The flocculant controller 144 is configured to adjust inflow of flocculant into the thickener 120 in accordance with commands from the thickener controller 140. The flocculant controller 144 is also configured to adjust inflow of flocculant and flocculant dilution into the thickener 120 in accordance with commands from the thickener controller 140. The adjustment of either inflow of flocculant or flocculant dilution into the thickener 120 in accordance with commands from the thickener controller 140 may be carried out by a separate controller. Further, the thickener controller 140 may be in signal communication with an underflow controller 146 associated with the underflow output 126. The underflow controller 146 is configured to adjust outflow of thickened slurry from the thickener 120 in accordance with commands from the thickener controller 140. It may be contemplated by a person skilled in the art that the feed controller 142, the flocculant controller 144 and the underflow controller 146 may comprise pumps and/or valves for controlling flow-rate based on commands from the thickener controller 140. The thickener controller 140 may use solutions of the models 130 to determine the values for the feed controller 142, the flocculant controller 144 and the underflow controller 146 which result in an optimized operation of the thickener 120.

The present disclosure further provides a method 200 for mineral recovery in the mining operation, as depicted in the form of a flow chart in FIG. 3. At 210, the mining operations model 130 is generated based on inputs of sensed conditions. As described above, generating operations model 130 may involve processing computer readable code with one or more data processing units associated with thickener controller 140.

At 220, commands are issued from the thickener controller 140 based on the mining operations model 130. At 230, a thickener is provided for mineral recovery in the mining operation. In some examples, thickener 120 is already provided before a mining operations model 130 is generated and before commands are issued from the thickener controller 140.

At 240, at the process water input 122 provided in the thickener 120 inflow of process water to the thickener 120 is adjusted with the feed controller 142 in accordance with commands from the thickener controller 140. Similarly, at 250, at a flocculant input 124 provided in the thickener 120 inflow of flocculant into the thickener and/or the flocculant dilution into the thickener 120 is adjusted with the commands from the flocculant controller 144 in accordance with commands from the thickener controller 140. Similarly, at 260, at the underflow output 126 provided in the thickener 120 outflow of thickened slurry from the thickener 120 is adjusted with the underflow controller 146 in accordance with commands from the thickener controller 140.

At 270, clarified water is dispensed from the thickener 120 with the overflow output 128. It may be understood that the method 200 utilizes values for the feed controller 142, the flocculant controller 144 and the underflow controller 146 which are appropriate for optimizing operation of the thickener 120, as discussed above.

The systems and methods of the present disclosure result in improvement in performance of the thickener 120. This is achieved by the adaptive thickener control approach as a result of using the model 130 and the thickener controller 140. The control approach is based on adaptive simulation of the current and future state, and performance, of the thickener 120. The systems and methods of the present disclosure combine information in real time from the upstream processes at the concentrator plant 110, such as lithology of solids in slurry, material distribution in the grinding circuit, physical properties of the solid fraction such as Particle Size Distribution (PSD), and average specific gravity (SG). This information is processed according to the model 130 to predict the physics of the settling of solid concentrate in the thickener 120. In turn, the thickener controller 140 issues control commands, based on the model 130, to various sub-assemblies of the thickener 120, for example, the feed controller 142, and/or the flocculant controller 144, and the underflow controller 146, to optimize the settling of solid concentrate and thereby control the operation of the thickener 120.

The present disclosure provides control schema for a thickener which exploits predictive models utilizing data from upstream of the thickener in the mining operation and issues control commands for the thickener control parameters. The systems and methods of the present disclosure may take advantage of a high-fidelity mathematical model of the sedimentation process based on physical insights into the thickener performance. The mathematical model utilizes data from the upstream process allowing for integration of the sensor data throughout the concentrator plant and providing predictions of the thickener feed properties. Further, the systems and methods may take advantage of machine learning models such as, but not limited to, artificial neural networks and reinforcement learning. Further, the present disclosure provides an adaptive simulation and optimization model that assimilates the output of the above models in real time and identifies optimization scenarios by comparing potential future trajectories of the thickener state or action value estimates over the available set of control variables. It may be understood that the previous approaches have not fully considered information from upstream of the thickener in the processing plant as input to a control system for thickeners, or applied machine learning to analyse large data sets and produce model components of these control systems. Further, previous approaches have not utilized predictions of future trajectories to identify optimal control scenarios.

Embodiments of the present disclosure substantially eliminate, or at least partially address, problems in the prior art, enabling more efficient and rapid water recovery for the mining operations while stabilizing thickener performance under constantly changing conditions of the upstream processes.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

Embodiments of the present disclosure are susceptible to being used for various purposes, including, though not limited to, enabling users to more accurately control the mining operation, and in particular the thickener operation.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A mineral recovery system for use in a mining operation, the mineral recovery system comprising:
    a mining operations generated model based on inputs of sensed conditions including conditions sensed at a thickener, as well as conditions sensed at one or more upstream systems of the mining operation at a concentrator plant, wherein the mining operations generated model utilizes a partial differential equation describing concentration of solids as a function of position and time in the thickener, wherein the mining operations generated model incorporates a thickener sub-model which utilizes a machine learning algorithm and a physical simulation of the thickener using the partial differential equation, wherein outputs of the thickener sub-model are quantitative predictions of performance variables;
    a thickener controller configured to issue commands based on the mining operations generated model;
    the thickener including:
        a process water input;
        an underflow output having an underflow controller configured to adjust outflow of thickened slurry from the thickener in accordance with commands from the thickener controller; and
        an overflow output configured to dispense clarified water from the thickener, wherein the thickener includes a flocculant input and a flocculant dilution input, and
    wherein the thickener sub-model is a prognostic model of the thickener and defines internal dynamics of the thickener to predict future states from recent sensed conditions, future control settings, and predicted inputs from a material sub-model, wherein sensed conditions includes at least one of: feed flow rate, feed density, underflow flow rate, underflow solids concentration, bed height, bed pressure, and rake torque, speed, and height, wherein the mining operations generated model describes a relationship between changing sensed conditions and describes future trajectories for each input and output, and compares future trajectories of a thickener state in respect of different sets of inputs and outputs.

2. The mineral recovery system as set forth in claim 1, wherein the process water input is provided with a feed controller configured to adjust inflow of process water to the thickener in accordance with commands from the thickener controller.

3. The mineral recovery system as set forth in claim 1, wherein the flocculant input is provided with a flocculant controller configured to adjust inflow of flocculant into the thickener in accordance with commands from the thickener controller.

4. The mineral recovery system as set forth in claim 1, wherein the flocculant dilution input is provided with a flocculant dilution controller configured to adjust inflow of dilution water into the thickener in accordance with commands from the thickener controller.

5. The mineral recovery system as set forth in claim 1, wherein the sensed conditions include conditions sensed at the thickener.

6. The mineral recovery system as set forth in claim 1, wherein the sensed conditions include conditions at one or more upstream systems of the mining operation.

7. The mineral recovery system as set forth in claim 1, wherein the mining operations generated model incorporates a material sub-model which further incorporates a material transport sub-model, wherein the material sub-model is a dynamic computational model that accounts for both material trasport through the concentrator plant, and influence of specific materials on the thickener performance by collecting data form the mineral recovery system.

8. The mineral recovery system as set forth in claim 7, wherein the material transport sub-model considers flow of material and residence times through the concentrator plant and yields a digital representation of circuit machinery, material streams, design mass balance, and measured process parameters such as flow rates, densities, material composition in order to track specific geological material through the concentrator plant and estimate residence times associated with various processing stages and predicts geological composition of material flows through upstream systems which may include a primary crusher feed, an overland feed, a SAG mill feed, a pebble crusher feed stockpile ball mills feed, a ball mill feed, a hydrocyclone feed flow rate, a hydrocyclone feed density, a secondary hydrocyclone feed flow rate, and a secondary hydrocyclone feed density.

9. The mineral recovery system as set forth in claim 1, wherein the material sub-model further incorporates a material influence sub-model, wherein the material influence sub-model considers influence of material type on a thickener performance and utilizes the machine learning algorithm to predicts key settling properties such as settling velocity and estimated percentage of underflow solids, from geological composition, chemical alterations, and information about particle size distribution of feed material.

10. The mineral recovery system as set forth in claim 9, wherein the material influence sub-model relates particle size, lithology and chemical alteration.

11. A method for mineral recovery in a mining operation, the method comprising:
providing a thickener and a thickener controller;
generating a mining operations model based on inputs of sensed conditions including conditions sensed at a thickener, as well as conditions sensed at one or more upstream systems of the mining operation at a concentrator plant, wherein the mining operations generated model utilizes a partial differential equation describing concentration of solids as a function of position and time in the thickener, wherein the mining operations generated model incorporates a thickener sub-model which utilizes a machine learning algorithm and a physical simulation of the thickener using the partial differential equation, wherein outputs of the thickener sub-model are quantitative predictions of performance variables;
using the thickener controller, issuing commands based on the mining operations model;
using a process water input of the thickener;
using an underflow output of the thickener, adjusting outflow of thickened slurry from the thickener with an underflow controller in accordance with commands from the thickener controller; wherein the thickener includes a flocculant input and a flocculant dilution input; dispensing clarified water from the thickener with an overflow output,
wherein the thickener sub-model is a prognostic model of the thickener and defines internal dynamics of the thickener to predict future states from recent sensed conditions and future control settings, wherein sensed conditions includes at least one of feed flow rate, feed density, underflow flow rate, underflow solids concentration, bed height, bed pressure, and rake torque, speed, and height, wherein the mining operations model describes a relationship between changing sensed conditions and describes future trajectories for each input and output, and compares future trajectories of a thickener state in respect of different sets of inputs and outputs.

12. The method as set forth in claim 11, wherein the method comprises providing the process water input with a feed controller, wherein the feed controller is configured to adjust inflow of process water to the thickener in accordance with commands from the thickener controller.

13. The method as set forth in claim 11, wherein the method comprises providing the flocculant input with a flocculant controller, wherein the flocculant controller is configured to adjust inflow of flocculant into the thickener in accordance with commands from the thickener controller.

14. The method as set forth in claim 11, wherein the flocculant dilution input is provided with a flocculant dilution controller configured to adjust inflow of dilution water into the thickener in accordance with commands from the thickener controller.

15. The method as set forth in claim 11, wherein inputting sensed conditions to the mining operations generated model includes inputting conditions sensed at the thickener.

16. The method as set forth in claim 11, wherein inputting sensed conditions to the mining operations generated model includes inputting conditions sensed at one or more upstream systems of the mining operation.

17. The method as set forth in claim 11, wherein inputting sensed conditions to the mining operations further comprises inputting sensed conditions to a thickener sub-model.

18. The method as set forth in claim 11, wherein inputting sensed conditions to the mining operations model further comprises inputting sensed conditions to a material sub-model.

19. The method as set forth in claim 18, wherein inputting sensed conditions to the material sub-model further comprises inputting sensed conditions to a material transport sub-model.

20. The method as set forth in claim 19, further comprising, with the material transport sub-model, relating geological composition of a primary crusher feed, an overland feed, a SAG mill feed, a pebble crusher feed stockpile to ball mills feed, a ball mill feed, a hydrocyclone feed flow rate, a hydrocyclone feed density, a secondary hydrocyclone.

* * * * *